United States Patent [19]

Straight

[11] 4,270,734
[45] Jun. 2, 1981

[54] PORTABLE WIRE PULLER

[76] Inventor: Larry A. Straight, N. 2815 Pittsburg, Spokane, Wash. 99207

[21] Appl. No.: 130,360

[22] Filed: Mar. 14, 1980

[51] Int. Cl.$^3$ .............................................. E21C 29/16
[52] U.S. Cl. ............................................ 254/134.3 R
[58] Field of Search ............... 254/134.3 FT, 134.3 R, 254/139.1, 139, 142

[56] References Cited

U.S. PATENT DOCUMENTS

| 245,334 | 8/1881 | Wolff | 254/142 |
|---|---|---|---|
| 2,307,681 | 1/1943 | Kalmbach | 254/142 |
| 3,968,952 | 7/1976 | Newell | 254/134.3 R |

FOREIGN PATENT DOCUMENTS 928146  11/1947  France ...................................... 254/142

*Primary Examiner*—Robert C. Watson
*Attorney, Agent, or Firm*—Wells, St. John & Roberts

[57] ABSTRACT

An automatic wire puller is described for drawing an electrical wire from a remote location to a junction box. The puller includes a frame adapted to fit between support studs adjacent an electrical junction or service box. Adjustable brackets on a top side of the frame extend out to engage the studs on back side edges thereof, while similar brackets on the frame bottom engage the opposite, front sides of the studs. A powered winch drawn on the frame turns on an axis spaced forwardly of the frame. The winch produces a moment against the two sets of brackets, causing them to securely clamp against the studs as the winch line is taken up onto the drum.

8 Claims, 5 Drawing Figures

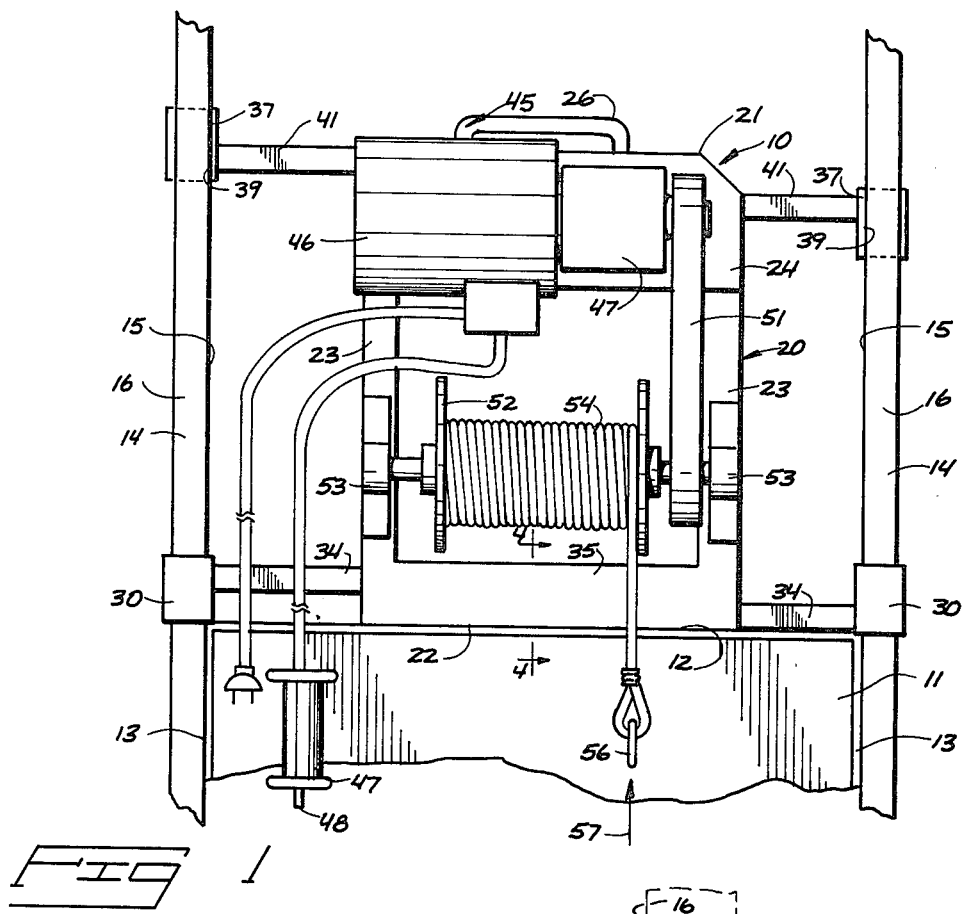
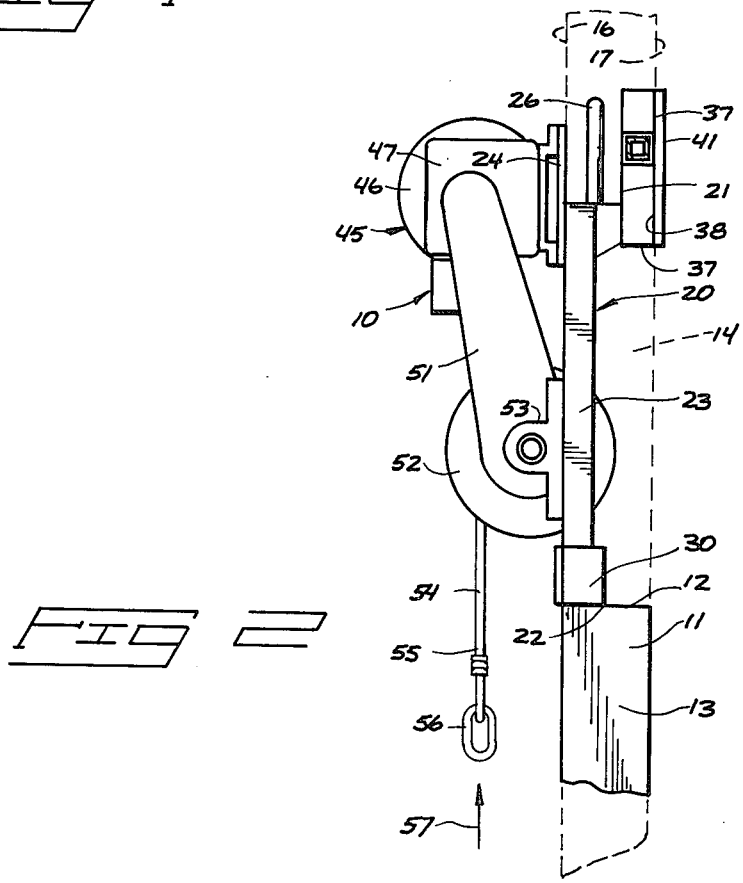

PORTABLE WIRE PULLER

BACKGROUND OF THE INVENTION

The present invention is related to apparatus for pulling electrical wires through conduit or other confined spaces to a terminal or service box.

Electrical wiring in nearly all phases of building construction is strung through walls, ceilings and other areas that are usually inaccessible to the electrician. Thus, the cables often have to be "fished" by sending a flexible line through the intended wire path, attaching the free end of the line to the wire, and subsequently pulling the line and wire back through the course.

Substantial difficulty has been experienced in pulling wires, especially heavy gauge wires that often lead underground along conduits from a supply source to a service inlet, for example, in an apartment building. Pulling the wire can require the combined pulling efforts of more than one person. Even when lighter gauge wire is to be pulled, the manual effort involved is tiring and time consuming.

BRIEF DESCRIPTION OF THE DRAWINGS

FIG. 1 is a front elevational view of the present puller mounted between two wall studs and resting on an electrical junction box;

FIG. 2 is a right side elevational view with the studs shown in dotted lines;

DETAILED DESCRIPTION OF A PREFERRED EMBODIMENT

Figure 3:
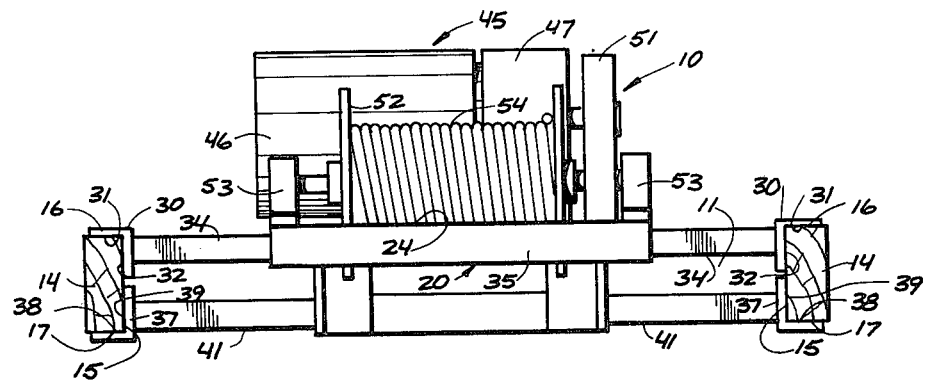
FIG. 3 is a bottom plan view.

The present portable wire puller is shown in the drawings and is generally designated therein by the reference character 10. The present wire puller 10 is provided for use in building structures, particularly new construction, to pull electrical wire through a conduit from a remote location to a service box or terminal 11.

A junction box 11 is diagrammatically illustrated in the accompanying drawings, including a horizontal top surface 12 and upright sides 13. The sides 13 are spaced apart to be mounted between upright supports or studs 14 for the associated wall, ceiling or floor.

Each of the studs 14 include facing side surfaces 15, forwardly facing front surfaces 16 and rearwardly facing back surfaces 17. The studs 14 are typically spaced apart by distances determined by building code and structural requirements. The spacing between the upright sides 13 of the terminal 11 may also depend on such spacing.

Figure 5:
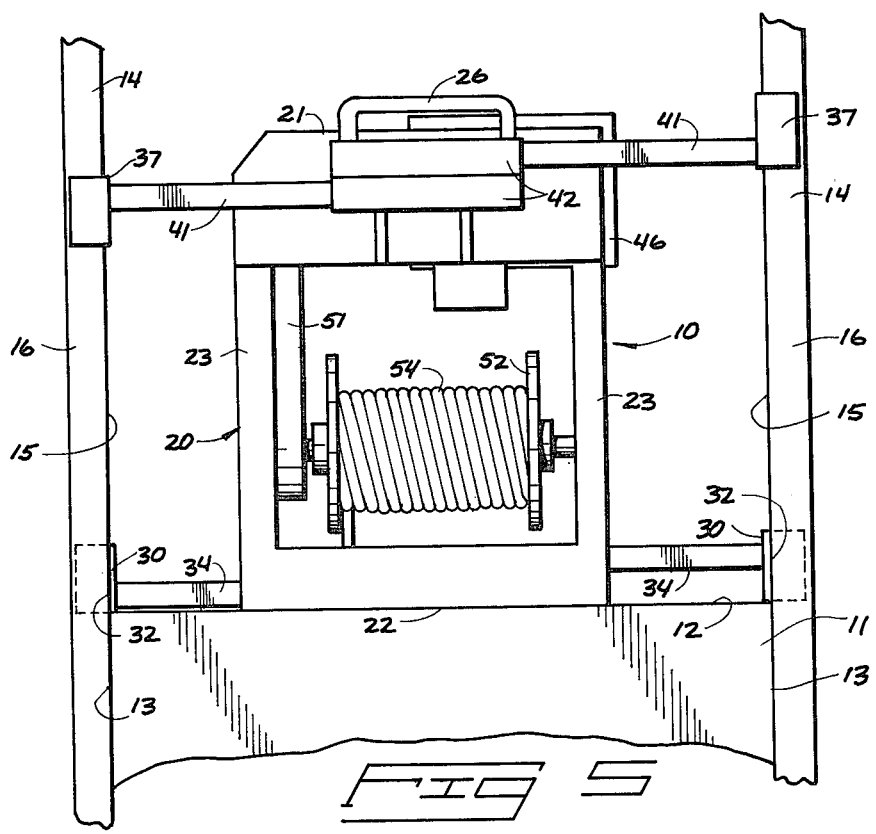
FIG. 5 is a rear elevation view as seen from behind in FIG. 1.

The present portable wire puller 10 includes a central rigid framework 20 that, as shown by FIGS. 1 and 5, is substantially rectangular. The frame 20 includes a horizontal top frame element 21 and a vertically spaced bottom frame element 22 joined by upright side frame element 23. The side frame elements 23 are spaced apart a distance substantially less than the distance between the adjacent studs 14. The frame 20 will therefore easily fit between any two adjacent studs of standard framing construction.

The frame elements 21, 22 and 23 define a periphery about an outwardly or forwardly facing surface 24 of the rigid frame 20. The surface 24 is provided to mount a winch assembly.

A carrying handle 26 is provided on the frame 20 adjacent the top 21. The handle 26 enables a worker to carry the portable puller 10 to any desired location. The handle further assists in mounting the puller 10 between adjacent studs 14. The handle 26 is affixed rigidly to the frame 20.

A first pair of bottom brackets 30 are movably mounted to the frame 20 for extending laterally to engage the adjacent studs 14. The first pair of brackets 30 are situated adjacent the bottom 22 of the frame and extend laterally outward thereof in opposite directions to engage the studs 14 along their front and inwardly facing surfaces 15 and 16.

Each of the brackets 30 of the first pair are substantially L-shaped in cross section as shown in FIG. 3. Each bracket includes a flat surface 31 for engaging an adjacent front surface 16 of a stud and a remaining flat surface 32 for engaging a stud side surface 15.

Figure 4:
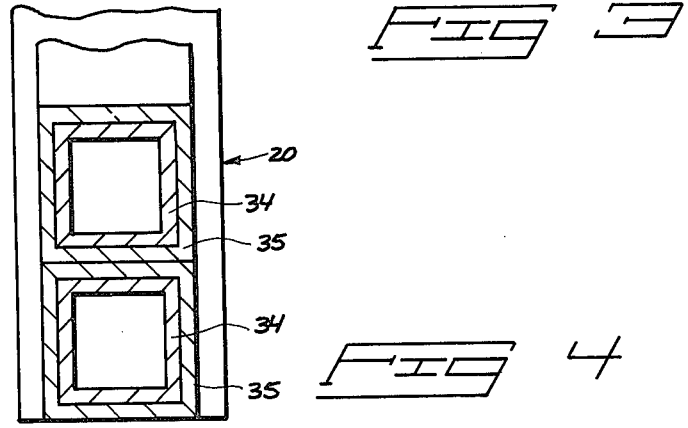
FIG. 4 is an enlarged fragmentary sectional view taken along line 2—2 in FIG. 1.

The brackets 30 are affixed to arms 34 that extend laterally of the frame 20. The arms 34 are parallel to one another and are slidably carried in a parallel relationship by tubular mounts 35 (FIG. 4). The mounts 35 are affixed to the frame 20 to allow free sliding motion of the brackets laterally to span distances corresponding to the spacing between adjacent studs 14. Appropriate locking mechanisms such as pins or detents (not shown) may be provided to releasably position the brackets at selected spacing corresponding to standard stud spacing.

A second pair of top brackets are shown at 37. Brackets 37 are L-shaped and are provided to engage the studs 14 along the back surfaces 17 thereof. Each bracket 37 includes a flat surface 38 (FIG. 3) for engaging the stud back surface 17 and a surface 39 for engaging the inwardly facing stud side surface 15.

The second pair of brackets 37 are affixed to the ends of arms 41 that are extendably mounted to the frame 20. The arms 41 are slidably carried within tubular mounts 42 (FIG. 5) situated at the top 21 of frame 20. The tubular mounts 42 are affixed to the frame 20 and, like the mounts 35, facilitate lateral positioning of the brackets 37 to positions corresponding to the spacing between adjacent studs of standard building construction.

A winch means 45 is provided along the front facing surface 24 of the frame 20. The winch means 45 is provided to payout and take-up a winchline that is adapted to be attached to the end of one or more electrical wires.

The winch means 45 may include a motor 46 mounted to the frame 20 adjacent its top 21. The motor 46 can include an appropriate hand control 47 (FIG. 1) that includes a control button 48 used to selectively activate or deactivate the motor 46. It is preferred that the button 48 and control 47 be arranged so the motor will be activated as the button is pushed and automatically deactivated when the button is released.

The motor 46 is connected to a gear box 47 of conventional construction for reducing the operational rpm of the motor and increasing the torque. The gear box 47, in turn, is connected to a linkage mechanism enshrouded by a cover or guard 51. The linkage is connected to a winch drum 52. Activation of the motor will cause corresponding rotation of the winch drum about an axis defined by spaced bearings 53. The bearings 53 mount the winch drum 52 for rotation about an axis substantially parallel with the arms 34 and 41 and spaced forwardly of the forward facing surface 24. The axis is therefore spaced forward of both pairs of brackets 30 and 37.

The winch drum 52 mounts an elongated winch line 54 that is preferably standard aircraft cable of a length between 200 and 400 feet and capacity of approximately 2500 pounds. The winch line is attached at an inward end (not shown) to the drum 52 and further includes a free end 55 that hangs freely from the drum 52. The end 55 includes a wire attaching device 56 (FIG. 2) that is especially adapted for securing the end or ends of electrical wire to be pulled.

Prior to operation, the installer carries the portable wire puller unit 10 to the area of the terminal 11. Typically, the "terminal box" is a circuit breaker panel and the wire to be pulled is from an outside meter box (not shown) to the breaker panel through a conduit.

Before mounting the wire puller between studs 14, the installer first extends the brackets 30 laterally outward until the distance between their surfaces 32 corresponds with the distance between the stud sides 15. The puller 10 can then be positioned above the terminal 11 with the bottom surface 22 resting on the top surface 12 of the box. The first brackets 30 will engage the adjacent studs 14 with the surfaces 31 engaging the front stud surfaces 16 and the remaining bracket surfaces 32 engaging the side stud surfaces 15.

The frame 20 is then tilted to an upright position to align the top 21 with the stud back surfaces 17. The second arms 41 can then be extended to position the second pair of brackets 37 in position to engage the studs 14 along the front surfaces 16 and back surfaces 17. Bracket surfaces 38 will engage the back stud surfaces 17 while bracket surfaces 39 will engage the inwardly facing stud sides 15. The cantilevered weight of the motor and winch drum will hold the frame in place on the studs.

Th motor 46 can then be connected to an appropriate electrical outlet. The winchline 56 can then be payed-out from the drum 52 and fed through an associated conduit (not shown) or whatever path through which the wire is to be pulled. The only requirement is that the winchline be pulled toward the frame 20 along a line that is substantially parallel with the stud surfaces 16 and 17 as illustrated by an arrow 57 in FIGS. 1 and 2.

If the area around the terminal 11 has been "dry-walled" or otherwise surfaced, a wooden frame can be built on which to fasten the puller. Such a frame should be the same width as the distance between the studs at the terminal and should extend substantially above the top of the box from the floor or adjacent rigid surface to which the frame can be attached. The newly constructed frame can be leaned against the wall adjacent to the studs and attached to the studs at the frame top with nails or other appropriate fasteners.

The wooden support frame can be constructed for other purposes as well, especially when the puller is to be used on horizontal surfaces. Thus, it is understood that the puller is best used after framing is finished, but can be adapted to substantially any wire pulling situation and can be used either vertically, horizontally or at relatively any angle therebetween, so long as the winchline is arranged along the prescribed line and is pulled in the prescribed direction.

When the cable has been fully extended through the wire path, the wire attaching device 56 is secured to the wire ends. The operator can then grasp the hand control 47 and push the button 48. This actuates the motor 46 and rotates the winch drum 52 to pull the winchline back onto the drum 52. The winchline is pulled back through the conduit, pulling the end of the wire along with it from the meter box to the circuit breaker box.

The pulling force of winchline 56 produces a moment arm that causes the frame to bind the brackets 30, 37 more forceably against the studs. As the pulling force increases, binding pressure increases the grip against the studs. Therefore, little of the pulling force, if any, is transmitted through the frame 20 to terminal 11. The force instead produces a binding force between the two pairs of brackets, securely clamping the puller to the engaged studs.

When the end of the wire has been pulled to its proper position in relation to the terminal 11, the operator can release the control button 48, deactuating the motor 46. The wire attaching device 56 can then be removed from the wire end and the wire puller may be easily removed from engagement with the studs simply be reversing the mounting steps discussed above.

The wire pulling operation performed by the above described wire puller 10 is faster and is accomplished with more ease than is manually possible. The time required to pull wires from one location to the other is substantially reduced, saving the valuable time of the installer for more constructive tasks. The puller 10 is easily transported from one location to another and, due to its compact configuration, is easily stored.

The above description and attached drawings are given by way of example to set forth a preferred form of my invention. Changes and modifications may be made that fall within the scope of the appended claims.

What I claim is:

1. A portable wire puller for pulling electrical wire in a prescribed direction substantially parallel to two spaced elongated supports with each support having a forwardly facing surface and an oppositely facing back surface, said wire puller comprising:
   a rigid frame having opposed sides joined by spaced ends in which the distance between the opposed sides is less than the distance between the elongated supports to enable the rigid frame to fit between the spaced elongated supports;
   a first pair of support engaging brackets mounted to the frame adjacent one frame end and adapted to extend laterally outward from the opposed sides to engage the spaced supports along the forwardly facing surfaces thereof;
   a second pair of support engaging brackets mounted to the frame adjacent the other frame end and adapted to extend laterally outward from the opposed sides to engage the spaced supports along the back surfaces thereof;
   winch means on the frame having a winch drum located thereon between the first and second pairs of brackets and spaced forwardly from the frame sides beyond the bracket pairs, for payingout and taking up an elongated winchline and for producing a clamping force on the support members as the winchline is taken up to pull electrical wire in the prescribed direction.

2. The wire puller as defined by claim 1:
   wherein the first pair of support engaging brackets are mounted to transverse first extendable arms on the frame to facilitate separation of the first bracket pair by a distance corresponding to the distance between the elongated supports; and
   wherein the second pair of support engaging brackets are mounted to transverse second extendable arms on the frame to facilitate separation of the second bracket pair by a distance corresponding to the distance between the elongated supports.

3. The wire puller as defined by claim 1 wherein each of the arms are tubular and are slidably mounted in tubular frame mounts that are directed transversely to the prescribed direction of pull.

4. The wire puller as defined by claim 1 wherein the winch means is comprised of:
   a motor mounted to the frame;
   a gear reduction unit connected to the motor;
   linkage means interconnecting the gear reduction unit with the winch drum for transmitting torque from the motor to the winch drum.

5. The wire puller as defined by claim 4 further comprising hand control means connected with the motor to enable selective operation of the winch means.

6. A wire puller as defined by claim 1 wherein the supports include facing side surfaces and wherein said wire puller further comprises surfaces on the first and second bracket pairs adapted to abut the oppositely facing support side surfaces.

7. The wire puller as defined by claim 6 wherein the first and second bracket pairs are "L" shaped with one leg of the L shape adapted to engage the front or back surfaces of a support and with the remaining leg of the L shape adapted to engage one of the oppositely facing side surfaces of the supports.

8. A portable wire puller for pulling electrical wire through a substantially vertical section of a conduit to a circuit breaker box situated between two adjacent parallel elongated upright support members having front surfaces and back surfaces, said wire puller comprising:
   a rigid rectangular frame having a forwardly facing surface defined by opposed longitudinal sides joined by spaced top and bottom ends, the bottom end being adapted to be positioned above the circuit breaker box between the upright support members;
   a first pair of support engaging brackets mounted to the frame at the bottom end thereof and extending transversely outward of the frame sides adapted to engage the back surfaces of the upright support members;
   a second pair of support engaging brackets mounted to the frame at the top end thereof and extending transversely outward of the frame sides adapted to engage the front surfaces of the upright support members at points thereon vertically spaced above the points of engagement between the first bracket pair and support members; and
   winch means including a winch drum mounted to the frame for rotation about a winch drum axis spaced in front of the forwardly facing frame surface and longitudinally situated between the first and second pairs of support engaging brackets, for paying-out and forceably taking up a winchline and adapted to clamp the bracket pairs against the engaged supports to support the portable wire puller on the upright supports.

* * * * *